US008463962B2

(12) United States Patent
Murari

(10) Patent No.: US 8,463,962 B2
(45) Date of Patent: Jun. 11, 2013

(54) MAC AND PHY INTERFACE ARRANGEMENT

(75) Inventor: Sharad Murari, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 1095 days.

(21) Appl. No.: 12/377,775

(22) PCT Filed: Aug. 1, 2007

(86) PCT No.: PCT/IB2007/004561
§ 371 (c)(1),
(2), (4) Date: Feb. 17, 2009

(87) PCT Pub. No.: WO2008/129354
PCT Pub. Date: Oct. 30, 2008

(65) Prior Publication Data
US 2010/0284451 A1 Nov. 11, 2010

Related U.S. Application Data

(60) Provisional application No. 60/838,747, filed on Aug. 18, 2006.

(51) Int. Cl.
*G06F 13/12* (2006.01)
*G06F 13/38* (2006.01)
*G06F 13/42* (2006.01)
*G06F 13/14* (2006.01)
*G06F 13/36* (2006.01)

(52) U.S. Cl.
USPC .............. 710/62; 710/65; 710/66; 710/105; 710/106; 710/305; 710/315

(58) Field of Classification Search
None
See application file for complete search history.

(56) References Cited

U.S. PATENT DOCUMENTS 7,020,729 B2 * 3/2006 Taborek et al. ............... 710/305
7,610,431 B1 * 10/2009 Watkins et al. ............... 710/312

(Continued)

FOREIGN PATENT DOCUMENTS

EP 1536343 A2 6/2005
WO 2006071838 6/2006

OTHER PUBLICATIONS

8b10b Encoder/Decoder MegaCore Function (ED8B10B), Altera, Nov. 2001, pp. 3-4, https://www.google.com/url?sa=t&rct=j&q=&esrc=s&source=web&cd=2&ved=0CEUQFjAB&url=http%3A%2F%2Fextras.springer.com%2F2001%2F978-0-306-47635-8%2Fds%2Fdsed8b.pdf&ei=72GNUZvAG4nI0QGRolH4Ag&usg=AFQjCNFikJ_C57swEd_ergON5gH_pVkZsw&sig2=l1QYDjjqvQYb8MGTSNQLzQ.*
D'Ambrosia, J. et al. "XAUI: An Overview," V 1.0, White Paper, 6 pgs. (Mar. 2002).

(Continued)

*Primary Examiner* — Kris Rhu

(57) ABSTRACT

According to an example embodiment of the present invention, a method is implemented for transmitting data between a Media Access Control Layer (MAC) (100) and a Physical Layer (PHY) (150) using an internal data bus for transmitting a set of internal symbols between the MAC (100) and PHY (150). A subset of internal symbols does not have a corresponding PHY symbol. An external data bus carries data symbols. An external interface (102, 118) provides command information on one or more dedicated command lines and provides the data symbols. An encoder (108, 110) encodes the provided command information into one or more of the subset of internal symbols. An internal interface (106, 107, 109, 111) transmits the one or more of the subset of internal symbols and the data symbols between the MAC (100) and PHY (150) using the internal data bus.

16 Claims, 16 Drawing Sheets

| S.No | TXD [7:0] | TXDECK | TXELECTRX_DLE | TXDETECTRX_LOOPBACK | TXCOMPLIANCE | RXPOLARITY | POWERDOWN [1:0] | eTXDATA[7:0], eTXDATAK | | | | | | | | | Encoded value |
|---|---|---|---|---|---|---|---|---|---|---|---|---|---|---|---|---|---|
| | | | | | | | | 7 | 6 | 5 | 4 | 3 | 2 | 1 | 0 | K | |
| 1 | XXXXXXXX | X | 1 | 0 | 0 | 0 | $P_1P_0$ | X | X | X | 0 | X | 0 | $P_1$ | $P_0$ | 1 | TxElecIdle = 1 |
| 2 | XXXXXXXX | X | 1 | 1 | 0 | 0 | 10 | X | X | X | 0 | X | 1 | 1 | 0 | 1 | RxDetect Sequence |
| 3 | XXXXXXXX | X | 0 | 1 | 0 | 0 | 00 | 0 | X | X | 1 | X | X | 1 | 1 | 1 | Loopback=1 |
| 4 | abc defgh | 1 | 0 | 0 | 0 | 0 | 00 | a | b | c | 1 | e | f | g | h | 1 | Transmit K-codes |
| 5 | abc defgh | 0 | 0 | 0 | 0 | 0 | 00 | a | b | c | d | e | f | g | h | 0 | Transmit D-codes |
| 6 | 101 11100 | 1 | 0 | 0 | 1 | 0 | 00 | 1 | 0 | 1 | 1 | 0 | 1 | 0 | 0 | 1 | Comma with TXCOMPLIANCE = 1 |
| 7 | 101 11100 | 1 | 0 | 0 | 0 | 1 | 00 | 1 | 0 | 1 | 1 | 1 | 0 | 0 | 0 | 1 | Comma with RxPolarity=1 |
| 8 | 010 10101 | 0 | 0 | 0 | 0 | 1 | 00 | 0 | 1 | 0 | 1 | 0 | 1 | 0 | 1 | 1 | D5.2 encoded with rxpolarity =1 |
| 9 | 010 01010 | 1 | 0 | 0 | 0 | 1 | 00 | 0 | 1 | 0 | 1 | 1 | 0 | 1 | 0 | 1 | D10.2 encoded with rxpolarity=1 |

U.S. PATENT DOCUMENTS

| | | | |
|---|---|---|---|
| 7,620,741 B2* | 11/2009 | Torudbakken et al. | 710/2 |
| 2004/0131035 A1 | 7/2004 | Wakeley et al. | |
| 2005/0135421 A1 | 6/2005 | Chang et al. | |
| 2006/0029100 A1* | 2/2006 | Dove | 370/474 |
| 2006/0095615 A1* | 5/2006 | Kim et al. | 710/62 |

OTHER PUBLICATIONS

Intel Corp. "PHY Interface for the PCI Express Architecture," V. 1.00, 32 pgs. (2003).

Hyun, Eugin, et al; "Design and Verification for PCI Express Controller"; Proceedings of the 3rd Intl Conference on Information and Appliation (ICITA'05); 0-7695-2316-1/05; IEEE, NY, USA.

Dhawan, Satish K; "Introduction to PCI Express—A New High Speed Serial Data Bus"; 2005 IEEE Nuclear Science Symposium Conference Record; 0-7803-9221-3/05; pp. 687-691.

Brierley-Green, David, et al; "A Low-Cost Programmable PCI Express Solution"; Excell Journal; Third Quarter 2005.

PCI Express; "PCI Express 2.0 Base Specification Revision 0.7"; Nov. 14, 2005; pp. 1-614.

PCI Express; "PX1011A/PX1012A—PCI Express Stand-Alone X1 PHY—Product Data Sheet"; Rev. 02; May 18, 2006.

Xilinx; "PCI Express Pipe Endpoint 1-Lane Core V1.4—Product Specification"; DS321; July 13, 2006.

* cited by examiner

FIG. 4

| Name | Source | Destination | Active Level | Description |
|---|---|---|---|---|
| RX_P | External | PHY | N/A | Differential receive signal from a PHY that connects to this PHY. |
| RX_N | External | PHY | N/A | Differential receive signal from a PHY that connects to this PHY. |
| TX_P | PHY | External | N/A | Differential transmit signal from a PHY that connects to this PHY. |
| TX_N | PHY | External | N/A | Differential transmit signal from a PHY that connects to this PHY. |

FIG. 5

| Name | Source | Destination | Active Level | Description |
|---|---|---|---|---|
| eTXDATA [7:0] | MAC | PHY | N/A | 8-bit transmit data from the MAC to the PHY. These lines also carry multiplexed command information from the MAC. |
| eTXDATAK | MAC | PHY | N/A | Data/command for the symbols of transmit data. A value of 0 indicates a data byte; a value of 1 indicates a control byte. Command signals passed to the PHY also have TXDATAK set high. |
| eRXDATA [7:0] | PHY | MAC | N/A | 8-bit receive data from the PHY to the MAC. It also carries status information form the PHY to the MAC |
| eRXDATAK | PHY | MAC | N/A | Data/control bit for the symbols of receive data. A value of 0 indicates a data byte; a value of 1 indicates a control byte. |
| RESETN | MAC | PHY | Low | Active low PHY reset. |
| RXIDLE | PHY | MAC | High | Indicates the presence of valid PCI Express Signal on the Rx pad. |
| RXSTATUS [2:0] | PHY | MAC | N/A | If present reports the following errors: disparity, decode, overrun, underrun, skip added, skip removed. |
| TXCLK | MAC | PHY | N/A | Source synchronous 250 MHz clock for transmit clock from MAC input. All the data and the input signals to the PHY are synchronized to this clock. |
| PCLK/RXCLK | PHY | MAC | N/A | Source Synchronous 250 MHz clock for received data bound for the MAC output. |

FIG. 6

| Name | Source | Destination | Active Level | Description |
|---|---|---|---|---|
| REFCLK_N | External | PHY | N/A | 100 MHz source clock input. Differential pair input. |
| REFCLK_P | External | PHY | N/A | 100 MHz source clock input. Differential pair input. |

FIG. 7

| PowerDown[1:0] | TxDetectRx | TxElecIdle | Description |
|---|---|---|---|
| P0: 00b | Loopback | 0 | 0 | PHY is transmitting data. MAC is providing data bytes to be sent every clock cycle. |
| | 0 | 1 | PHY is not transmitting and is in electrical idle. |
| | 1 | 0 | PHY goes into loopback mode. |
| | 1 | 1 | Illegal. MAC should never do this. |
| P0s: 01b | Don't care | 0 | Illegal. MAC should always have PHY doing electrical idle while in P0s. PHY behavior is undefined if TxElecIdle is deasserted while in P0s or P1. |
| | | 1 | PHY is not transmitting and is in electrical idle. |
| P1: 10b | Don't care | 0 | Illegal. MAC should always have PHY doing electrical idle while in P1. PHY behavior is undefined if TxElecIdle is deasserted while in P0s or P1. |
| | 0 | 1 | PHY is idle. |
| | 1 | 1 | PHY does a receiver detection operation. |
| P2: 11b | Don't care | 0 | PHY transmits Beacon signaling |
| | | 1 | PHY is idle |

FIG. 8

Table B-2: 8b/10b Special Character Symbol Codes

| Data Byte Name | Data Byte Value | Bits HGF EDCBA | Current RD − abcdei fghj | Current RD + abcdei fghj |
|---|---|---|---|---|
| K28.0 | 1C | 000 11100 | 001111 0100 | 110000 1011 |
| K28.1 | 3C | 001 11100 | 001111 1001 | 110000 0110 |
| K28.2 | 5C | 010 11100 | 001111 0101 | 110000 1010 |
| K28.3 | 7C | 011 11100 | 001111 0011 | 110000 1100 |
| K28.4 | 9C | 100 11100 | 001111 0010 | 110000 1101 |
| K28.5 | BC | 101 11100 | 001111 1010 | 110000 0101 |
| K28.6 | DC | 110 11100 | 001111 0110 | 110000 1001 |
| K28.7 | FC | 111 11100 | 001111 1000 | 110000 0111 |
| K23.7 | F7 | 111 10111 | 111010 1000 | 000101 0111 |
| K27.7 | FB | 111 11011 | 110110 1000 | 001001 0111 |
| K29.7 | FD | 111 11101 | 101110 1000 | 010001 0111 |
| K30.7 | FE | 111 11110 | 011110 1000 | 100001 0111 |

FIG. 9

| S.No | TXD[7:0] | TXDETECTRX_LOOPBACK | TXDETECTRX_LOOPBACK | TXCOMPLIANCE | RXPOLARITY | POWERDOWN[1:0] | eTXDATA[7:0], eTXDATAK | | | | | | | | | Encoded value |
|---|---|---|---|---|---|---|---|---|---|---|---|---|---|---|---|---|
| | | TXELECIDLE | | | | | 7 | 6 | 5 | 4 | 3 | 2 | 1 | 0 | K | |
| 1 | XXXXXXXX | X | X | 0 | 0 | $P_1P_0$ | X | X | X | 0 | X | 0 | $P_1$ | $P_0$ | 1 | TxElecIdle = 1 |
| 2 | XXXXXXXX | X | 0 | 0 | 0 | 10 | X | X | X | 0 | X | 1 | 1 | 0 | 1 | RxDetect Sequence |
| 3 | XXXXXXXX | X | 1 | 0 | 0 | 00 | 0 | X | X | 1 | X | X | 1 | 0 | 1 | Loopback=1 |
| 4 | abc defgh | 1 | 0 | 0 | 0 | 00 | a | b | c | 1 | e | f | g | h | 1 | Transmit K-codes |
| 5 | abc defgh | 0 | 0 | 0 | 0 | 00 | a | b | c | d | e | f | g | h | 0 | Transmit D-codes |
| 6 | 101 11100 | 1 | 0 | 1 | 0 | 00 | 1 | 0 | 1 | 1 | 0 | 1 | 0 | 0 | 1 | Comma with TXCOMPLIANCE = 1 |
| 7 | 101 11100 | 1 | 0 | 0 | 1 | 00 | 1 | 0 | 1 | 1 | 1 | 0 | 0 | 0 | 1 | Comma with RxPolarity=1 |
| 8 | 010 10101 | 0 | 0 | 0 | 1 | 00 | 0 | 1 | 0 | 1 | 0 | 1 | 0 | 1 | 1 | D5.2 encoded with rxpolarity=1 |
| 9 | 010 01010 | 1 | 0 | 0 | 1 | 00 | 0 | 1 | 0 | 1 | 1 | 0 | 1 | 0 | 1 | D10.2 encoded with rxpolarity=1 |

FIG. 10

| eRXDATA | | | | | | | | eRXDATAK | Encoded value |
|---|---|---|---|---|---|---|---|---|---|
| 7 | 6 | 5 | 4 | 3 | 2 | 1 | 0 | | |
| 0 | X | X | X | X | 0 | PHYSTATUS | X | 1 | Encoded PHYSTATUS |

FIG. 11

| eRXDATA | | | | | | | | eRXDATAK | Encoded value |
|---|---|---|---|---|---|---|---|---|---|
| 7 | 6 | 5 | 4 | 3 | 2 | 1 | 0 | | |
| 0 | X | X | X | X | 0 | 0 | X | 1 | RXVALID=0 |

FIG. 12

| eRXDATA | | | | | | | | eRXDATAK |
|---|---|---|---|---|---|---|---|---|
| 7 | 6 | 5 | 4 | 3 | 2 | 1 | 0 | |
| 0 | X | X | X | RXVALID | PHYSTATUS | 1 | X | 0 | 1 |

FIG. 13

| RXSTATUS [2] | [1] | [0] | Description |
|---|---|---|---|
| 0 | 0 | 0 | Received data OK |
| 0 | 0 | 1 | 1 SKP added |
| 0 | 1 | 0 | 1 SKP removed |
| 0 | 1 | 1 | Receiver detected |
| 1 | 0 | 0 | 8B/10B decode error |
| 1 | 0 | 1 | Elastic Buffer overflow |
| 1 | 1 | 0 | Elastic Buffer underflow |
| 1 | 1 | 1 | Receive disparity error |

FIG. 14

| Symbol | eRXDATA 7 | 6 | 5 | 4 | 3 | 2 | 1 | 0 | eRXDATAK K | Encoded value |
|---|---|---|---|---|---|---|---|---|---|---|
| 1 | 0 | X | X | X | 0 | 0 | X | X | 1 | RXVALID=0 |
| 2 | X | X | X | 1 | X | X | X | X | 1 | DISPARITY ERROR=0 |
| 3 | X | X | X | 0 | X | X | X | X | 1 | DISPARITY ERROR=1 |
| 4 | 0 | 1 | 1 | 1 | 1 | 1 | 1 | 0 | 1 | Encoded EDB with DECODE ERROR |
| 5 | 0 | 1 | 1 | 1 | 1 | 1 | 0 | 1 | 1 | Encoded EDB with fifo underrun |
| 6 | 1 | 0 | 1 | 1 | 1 | 1 | 0 | 1 | 1 | COMMA with SKIP inserted |
| 7 | 1 | 0 | 1 | 1 | 1 | 1 | 1 | 0 | 1 | COMMA with SKIP removed |
| 8 | 0 | X | X | X | X | 0 | Phy_status | X | 1 | Encoded PhyStatus |
| 9 | 0 | X | X | X | X | 0 | X | rx_detect | 1 | Receiver detect response |

FIG. 15

| S. No | TXDATA[7:0] | TX DA TA K | TX EL ECI DL E | TXD ETEC TRX_ LOO PBA CK | TX CO MP LI AN CE | RX PO LA RIT Y | POW ERD OWN [1:0] | eTXDATA[7:0], eTXDATAK | | | | | | | | | Encoded value |
|---|---|---|---|---|---|---|---|---|---|---|---|---|---|---|---|---|
| | | | | | | | | 7 | 6 | 5 | 4 | 3 | 2 | 1 | 0 | K | |
| 1 | XXXXXXXX | X | 1 | 0 | 0 | 0 | $P_1P_0$ | X | X | X | 0 | 1 | 0 | $P_1$ | $P_0$ | 1 | Start parallel Loopback |
| 2 | XXXXXXXX | X | 1 | 0 | 0 | 0 | $P_1P_0$ | X | X | X | 0 | 0 | 0 | $P_1$ | $P_0$ | 1 | Stop parallel Loopback |

FIG. 16

| S. No | TXDATA[7:0] | TX DA TA K | TX EL ECI DL E | TXD ETEC TRX_ LOO PBA CK | TX CO MP LI AN CE | RX PO LA RIT Y | POW ERD OWN [1:0] | eTXDATA[7:0], eTXDATAK ||||||||| | Encoded value |
|---|---|---|---|---|---|---|---|---|---|---|---|---|---|---|---|---|
| | | | | | | | | 7 | 6 | 5 | 4 | 3 | 2 | 1 | 0 | K | |
| 1. | 101 11100 | 1 | 0 | 0 | 1 | 0 | 00 | 1 | 0 | 1 | 1 | 1 | 1 | 1 | 0 | 1 | PLAIN COMMA |
| 2. | 101 11100 | 1 | 0 | 0 | 1 | 0 | 00 | 1 | 0 | 1 | 1 | 1 | 1 | 0 | 0 | 1 | COMMA with Lane Reversal=1 |
| 3. | 101 11100 | 1 | 0 | 0 | 1 | 0 | 00 | 1 | 0 | 1 | 1 | 0 | 1 | 1 | 0 | 1 | Comma with TXCOMPLIAN CE = 1 |
| 4. | 101 11100 | 1 | 0 | 0 | 1 | 0 | 00 | 1 | 0 | 1 | 1 | 0 | 1 | 1 | 0 | 1 | Comma with TXCOMPLIAN CE = 1 Lane Reversal=1 |
| 5. | 101 11100 | 1 | 0 | 0 | 0 | 1 | 00 | 1 | 0 | 1 | 1 | 1 | 0 | 0 | 0 | 1 | Comma with RxPolarity=1 |
| 6. | 101 11100 | 1 | 0 | 0 | 0 | 1 | 00 | 1 | 0 | 1 | 1 | 1 | 0 | 1 | 0 | 1 | Comma with RxPolarity=1 Lane Reversal=1 |

FIG. 17

| S. No | TXDATA[7:0] | TX DATA K | TX EL ECI DL E | TXD ETEC TRX_ LOO PBA CK | TX CO MP LI AN CE | RX PO LA RIT Y | POW ERD OWN [1:0] | eTXDATA[7:0], eTXDATAK |   |   |   |   |   |   |   |   |   | Encoded value |
|---|---|---|---|---|---|---|---|---|---|---|---|---|---|---|---|---|---|---|
|   |   |   |   |   |   |   |   | 7 | 6 | 5 | 4 | 3 | 2 | 1 | 0 | K |   |
| 1. | XXXXXXXX | X | 1 | 0 | 0 | 0 | $P_1P_0$ | X | X | X | 0 | X | 0 | $P_1$ | $P_0$ | 1 | TxElecIdle = 1 OLD |
| 2. | XXXXXXXX | X | 1 | 0 | 0 | 0 | $P_1P_0$ | 0 | X | X | 0 | X | 0 | $P_1$ | $P_0$ | 1 | TxElecIdle = 1 NEW |
| 3. | XXXXXXXX | X | 1 | 0 | 0 | 0 | 00 | 1 | X | X | 0 | X | X | X | X | 1 | TxElecIdle = 0 NEW |
| 4. | 101 11100 | 1 | 0 | 0 | 1 | 0 | 00 | 1 | 0 | 1 | 0 | 1 | 1 | 0 | 1 | 1 | Comma and Start Lane-to-Lane Deskew |
| 5. | 101 11100 | 1 | 0 | 0 | 1 | 0 | 00 | 1 | 0 | 1 | 0 | 1 | 1 | 0 | 0 | 1 | Comma and Stop Lane-to-Lane Deskew |

FIG. 18

| Symbol | eRXDATA | | | | | | | | eRXDATAK | Encoded value |
|---|---|---|---|---|---|---|---|---|---|---|
| | 7 | 6 | 5 | 4 | 3 | 2 | 1 | 0 | K | |
| 1. | 1 | 0 | 0 | 1 | 1 | 1 | 1 | 1 | 1 | deskew done and passed |
| 2. | 1 | 0 | 0 | 1 | 1 | 1 | 1 | 0 | 1 | deskew done and failed |
| 3. | 1 | 0 | 0 | 1 | 1 | 1 | 0 | 1 | 1 | performing deskew |
| 4. | 1 | 0 | 0 | 1 | 1 | 1 | 1 | 1 | 1 | deskew done and passed |
| 5. | 1 | 0 | 0 | 1 | 1 | 1 | 1 | 0 | 1 | deskew done and failed |
| 6. | 1 | 0 | 0 | 1 | 1 | 1 | 0 | 1 | 1 | performing deskew |

MAC AND PHY INTERFACE ARRANGEMENT

RELATED APPLICATIONS

This application claims benefit under 35 U.S.C. 119(e) to U.S. Patent Application No. 60/838,747, entitled "Low Pin Count PCI Express PHY Interface (LPXPIPE)" and filed on Aug. 15, 2006, which is fully incorporated herein by reference.

FIELD OF THE INVENTION

The present invention relates generally to communications and, more particularly, to communication methods and arrangements involving MAC and PHY interfaces.

BACKGROUND

Many different types of electronic communications are carried out for a variety of purposes and with a variety of different types of devices and systems. One type of electronic communications system involves those communications associated with BUS-type communications between two or more different components. For instance, computers typically include a central processing unit (CPU) that communicates with peripheral devices via a bus. Instructions and other information are passed between the CPU and the peripheral devices on a communications BUS or other link.

One type of communications approach involves the use of a PCI (Peripheral Component Interconnect) system. PCI is an interconnection system between a microprocessor and attached devices in which expansion slots are spaced closely for high speed operation. Using PCI, a computer can support new PCI cards while continuing to support Industry Standard Architecture (ISA) expansion cards, which is an older standard. PCI is designed to be independent of microprocessor design and to be synchronized with the clock speed of the microprocessor. PCI uses active paths (on a multi-drop bus) to transmit both address and data signals, sending the address on one clock cycle and data on the next. The PCI bus can be populated with adapters requiring fast accesses to each other and/or system memory and that can be accessed by a host processor at speeds approaching that of the processor's full native bus speed. Read and write transfers over the PCI bus are implemented with burst transfers that can be sent starting with an address on the first cycle and a sequence of data transmissions on a certain number of successive cycles. PCI-type architecture is widely implemented, and is now installed on most desktop computers.

PCI Express architecture exhibits similarities to PCI architecture with certain changes. PCI Express architecture employs a switch that replaces the multi-drop bus of the PCI architecture with a switch that provides fan-out for an input-output (I/O) bus. The fan-out capability of the switch facilitates a series of connections for add-in, high-performance I/O. The switch is a logical element that may be implemented within a component that also contains a host bridge. A PCI switch can logically be thought of, e.g., as a collection of PCI-to-PCI bridges in which one bridge is the upstream bridge that is connected to a private local bus via its downstream side to the upstream sides of a group of additional PCI-to-PCI bridges.

In PCI Express applications that provide a connection between MAC and PHY chips, an interconnection bus is used to transmit data and command therebetween. The number of pins available for input/output purposes is limited by the particular chip and package size thereof. Sometimes the number of pins is as much or more of a constraining factor than the amount of logic available on the chip dies. Moreover, in some applications the interconnections between chips is limited due to insufficient routing space and constraints. For instance, increased signal frequencies often require strict routing guidelines that may quickly exhaust the available routing space.

These and other limitations present challenges to the implementation of integrated devices with a variety of communications approaches.

SUMMARY

Various aspects of the present invention involve communication approaches for a variety of computer circuits, such as those including communication BUS-type structures (e.g., PCI structures) and others. The present invention is exemplified in a number of implementations and applications, some of which are summarized below.

According to an example embodiment of the present invention, Media Access Control Layer (MAC) and a Physical Layer (PHY) interface is implemented. The interface transfers data between the MAC and PHY using a first protocol having a set of symbols. The PHY interface transmits data using a second protocol having a set of symbols that is a subset of the first protocol. Using the symbols of the first protocol that are not present in the second protocol, status and command lines are transferred between the MAC and PHY interface. The status and command lines are then decoded and provided to the appropriate logic.

According to an example embodiment of the present invention, the MAC and PHY interface are part of a computer system and the PHY interface is a PCI express interface.

According to an example embodiment of the present invention, a method is implemented for transmitting data between a Media Access Control Layer (MAC) and a Physical Layer (PHY) using an internal data bus for transmitting a set of internal symbols between the MAC and PHY. A subset of internal symbols exists that do not have a corresponding PHY symbol. Command information carried on one or more dedicated command lines is provided. Data symbols carried on an external data bus are also provided. The provided command information is encoded into one or more of the subset of internal symbols. The one or more of the subset of internal symbols is transmitted between the MAC and PHY using the internal data bus.

According to an example embodiment of the present invention, a system is implemented for transmitting data between a Media Access Control Layer (MAC) and a Physical Layer (PHY) using an internal data bus for transmitting a set of internal symbols between the MAC and PHY. A subset of internal symbols exists that does not have a corresponding PHY symbol. The system includes an external data bus carrying data symbols; an external interface for providing command information carried on one or more dedicated command lines and providing the data symbols; an encoder for encoding the provided command information into one or more of the subset of internal symbols; and an internal interface for transmitting the one or more of the subset of internal symbols between the MAC and PHY using the internal data bus.

The above summary of the present invention is not intended to describe each embodiment or every implementation of the present invention. The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 4 shows PHY signals that use the low pin count PHY interface to transmit data to and from the MAC, according to an example embodiment of the present invention;

FIG. 5 shows a portion of low pin count PHY interface having 22 to 25 pins, according to an example embodiment of the present invention;

FIG. 6 shows reference clocks used in the interface, according to an example embodiment of the present invention;

FIG. 7 shows valid combinations of TX command signals, used by an example embodiment of the present invention;

FIG. 8 shows a valid set of K-codes, used by an example embodiment of the present invention;

FIG. 9 shows the encoding and the decoding summary of possible COMMAND sequences from the MAC to the PHY, according to an example embodiment of the present invention;

FIG. 10 shows an example of PHYSTATUS encoding, according to an example embodiment of the present invention;

FIG. 11 shows an example of RXVALID encoding, according to an example embodiment of the present invention;

FIG. 12 shows an example of RX decoding, according to an example embodiment of the present invention;

FIG. 13 shows an example of RXSTATUS encoding, according to an example embodiment of the present invention;

FIG. 14 shows how various bits can be used by the decoder to decode certain status/states from the PHY, according to an example embodiment of the present invention;

FIG. 15 shows an example of 2 eK-codes to start and stop PXPIPE side parallel loopback, according to an example embodiment of the present invention;

FIG. 16 shows an example of eK-codes to enable and disable lane reversal, according to an example embodiment of the present invention;

FIG. 17 shows redefining of the TXELECIDLE encoding, according to an example embodiment of the present invention, and FIG. 18 shows a response from the PHY, according to an example embodiment of the present invention.

Figure 1:
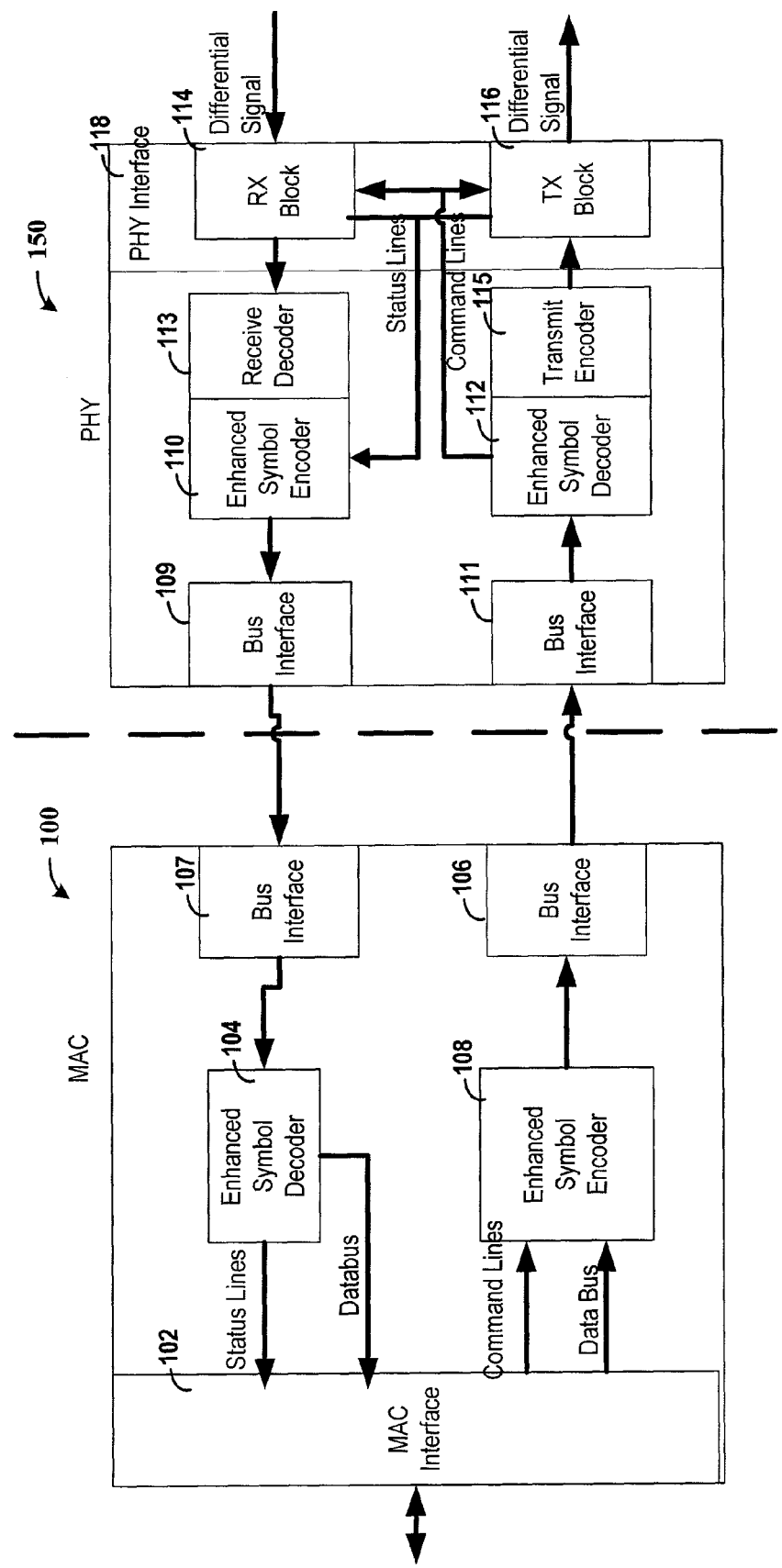
FIG. 1 shows a block diagram of a MAC and PHY interface, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The present invention is believed to be applicable to a variety of circuits and approaches involving electronic communications, and in particular to those involving communications between MAC and PHY. While the present invention is not necessarily limited to such applications, an appreciation of various aspects of the invention is best gained through a discussion of examples in such an environment. According to an example embodiment of the present invention an interface protocol is implemented for transmitting information between MAC and PHY devices. A MAC or PHY device receives command information on dedicated command lines and also receives data symbols on a data bus using lines distinct from the command lines. The received symbols are part of a first data format that is capable of encoding a set of N symbols. The PHY is arranged to convert the data symbols of the first data format to data symbols of a second data format. The second data format is limited to a set of M valid symbols, where M is less than N. Accordingly there exists a set of symbols from the first data format that has no corresponding, valid symbol in the second data format. The MAC interface protocol encodes the command information into those symbols have no correspondence. An internal data bus is then used to transmit the encoded symbols between the MAC and PHY devices. This is particularly useful for reducing the pin count of the interface between the MAC and PHY.

According to one embodiment, the second format has a transmission restriction that limits the number of valid symbols. For instance, some transmission protocols require symbols that have balanced binary bits (i.e., equal 0's and 1's). Such a restriction is sometimes necessary in differential pair and other transmissions (e.g., to avoid DC drift in for AC coupled signals). Another example transmission restriction is the avoidance of a large number of consecutive bits of the same value. Such a restriction is often necessary where a clock signal is synchronized with the data by tracking data transitions.

In a more specific embodiment, the devices are PCI Express devices. The MAC and PHY devices function as an interface between the PHY-based differential signal environment and the MAC signal environment. The external interfaces to the combination of MAC and PHY devices may operate according to the PCI Express standard. In a particular instance, the MAC and PHY devices operate largely in accordance with the PCI Express standard for a PHY interface. The MAC and PHY devices encode the command data that is otherwise implemented using command lines (e.g., under the PIPE or PXPIPE interfaces) to symbols. The symbols may be chosen from symbols otherwise undefined by the MAC to PHY interface. In one instance a specially defined COMMA or K symbol is used. A COMMA symbol is a special bit pattern that may be used to determine symbol alignment in a stream of data. It may consist of a unique bit pattern that is used in bit streams to identify special control sequences not normally found in conventional user data. The nature of the 8-bit to 10-bit coding provides a comma sequence that does not occur in the transmission of non-comma characters, and hence, identifies symbol boundaries.

FIG. 1 shows a block diagram of a MAC 100 and PHY 150 and an interface therebetween, according to an example embodiment of the present invention. Data flows between MAC interface 102 and PHY interface 118. Data is received from the MAC interface on a data bus that is received by Bus Interface 106. The data bus transmits data using a set of symbols. Due to the properties of the PHY interface, there is a set of otherwise valid symbols that are unused but otherwise capable of being transmitted on this data bus. Enhanced symbol encoder 108 receives dedicated command/status lines. The dedicated lines carry information for use by the PHY interface. As such, they are encoded into the symbols of the otherwise valid symbols and sent to bus interface 106. Bus interface 106 transmits the symbols to PHY 150 and more specifically to bus interface 111.

The command/status lines may be selected from a plurality of possible command/status lines. For instance, some command/status lines may require immediate transmission or the lines may be used in states where the data bus is not reliable (e.g., startup, shutdown or sleep modes). Thus, not all command/status lines need be encoded or decoded. Allowing the designer of the system the ability to select which command/status lines are encoded and which command/status lines remain as dedicated lines provides increased flexibility in the application of various embodiments of the invention. Such flexibility is particularly useful for implementing variations of the invention across a variety of platforms.

On the PHY side 150, enhanced symbol decoder 112 decodes the encoded command signals back to dedicated command lines. Transmit encoder 115 encodes the data from decoder 112 using a protocol that does have valid symbols that correspond to each of the encoded command symbols. TX block 116 then transmits the data from transmit encoder 115. An example of such protocols includes various line-coding protocols, such as 64b/66b, 8b/10b, 5b/6b or 3b/4b. The set of valid symbols on the PHY side of such protocols is often limited due to various transmission requirements. For instance, differential signaling may require balanced (DC) symbols or be limited to symbols that do not have excessive bits of the same value (e.g., to allow for accurate clock extraction from the data signal). This may also help reduce noise issues between other data busses. While FIG. 1 shows the PHY side 150 as using a differential signal, various embodiments of the invention are applicable to other signal protocols.

The PHY side 150 is also shown with an RX block 114 that receives incoming data and produces status/command lines. Receive decoder 113 decodes the data from RX block 114 into a protocol has valid symbols that are not present in the protocol of the data received from RX block 114. These valid symbols are then used to encode status/command symbols via enhanced symbol encoder 110. Similar to the enhanced symbol encoder block 108, the status/command lines are encoded into otherwise unused symbols and sent to bus interface 109. The symbols are transmitted to the MAC side 100, and more specifically, to bus interface 107. Enhanced symbol decoder 104 decodes the encoded status/command lines and provides the corresponding status/command lines to MAC interface 102. In a specific embodiment, both transmit encoder 115 and receive decoder 113 convert data between 10b and 8b protocols. As discussed herein, a variety of other protocols can also be used.

In one embodiment of the present invention, the MAC and PHY system of FIG. 1 is implemented using a circuit that uses programmable logic devices to provide the functionality discussed herein. For instance, each of blocks 102 to may be implemented within a programmable logic device.

In another embodiment of the present invention, the MAC and PHY system of FIG. 1 is implemented using one or more integrated circuit chips.

In one instance, a combination of one or more integrated circuit chips, discrete logic and/or programmable logic blocks is used. In another instance, one integrated circuit chip is used for the MAC portion and another integrated circuit chip is used for the PHY portion. In yet another instance, the entire MAC and PHY interface may be implemented on a single chip.

A specific embodiment of the invention involves a PCI Express MAC/PHY interface. While the invention is not limited to such an interface, the following discussion discloses various aspects of such an interface. It should be apparent that many of the specific details, such as bit selections, may be implemented using a number of similar implementations. In this manner, the specific details are meant to merely illustrate a specific embodiment and are not meant to be limiting.

Various aspects of the invention utilize the fact that there are command and status signals between the PHY and MAC that are mostly static. Special sequences of pairs of sequences (TXDATAK, TXDATA[7:0]) and (RXDATAK, RXDATA[7:0]) are used to encode these command and status signals.

With respect to the transmit signals, out of the possible 512 combinations (i.e., 9 lines TXDATAK and TXDATA[7:0]), only 256 data symbols (with TXDATAK low) and approximately 12 other symbols known as Kcodes (with TXDATAK high) have valid defined meaning. This means that approximately 244 characters (all with TXDATAK high) have no meaning and would never occur in the normal data transmission or reception. A similar reasoning holds for the RXDATAK and RXDATA[7:0].

Most command and status signals toggle when no data transmission occurs. This property allows these command and status signals to be encoded as special TXDATAK or RXDATAK characters. Henceforth, the shorthand notation of DATAK characters (or K-code) will be used to denote either TXDATAK or RXDATAK characters. In cases where these command and status signals do change during normal data transmission, the symbols are replaced by special DATAK characters. For example, Rxpolarity can change during normal data transmission, this however occurs during TS1/TS2 sets transmission. TS1 and TS2 sets always have a Comma. So a newly defined K-code (COMMA-P) is transmitted instead of a COMMA that represents a COMMA as well as Rxpolarity=1.

A COMMA is defined as DATA[7:0]=BCh="101 11100", and DATAK='1'. COMMA-P can be any 8-bit sequence of DATA[7:0] and DATAK='1' as long as that sequence of DATA[7:0] has not already been defined by PCI Express as a valid K-code.

The following method allows for the defining of new K-codes called eK-codes (i.e., Enhanced K-codes) for use in transmitting command and status information specifically for PCI Express. Without loss of generality, only one possible example of the encoding scheme is presented in the description, while various variations of actual implementation may vary.

FIG. 4 shows PHY signals that use the low pin count PHY interface to transmit data to and from the MAC, according to an example embodiment of the present invention. FIG. 6 shows reference clocks used by the interface.

The low pin count PHY interface has 22 to 25 pins as shown by FIG. 5. The low pin count PXPIPE interface includes the encoding of command signals from the MAC to the PHY on eTXDATA and eTXDATAK lines and the encoding of STATUS signals from the PHY to the MAC on eRXDATA and eRXDATAK.

The following command signals are encoded and multiplexed with TXDATA and TXDATAK to generate eTXDATA and eTXDATAK: TXDETECTRX_LOOPBACK; TXELECIDLE; TXCOMPLIANCE; RXPOLARITY; and POWERDOWN[1:0].

Figure 2:
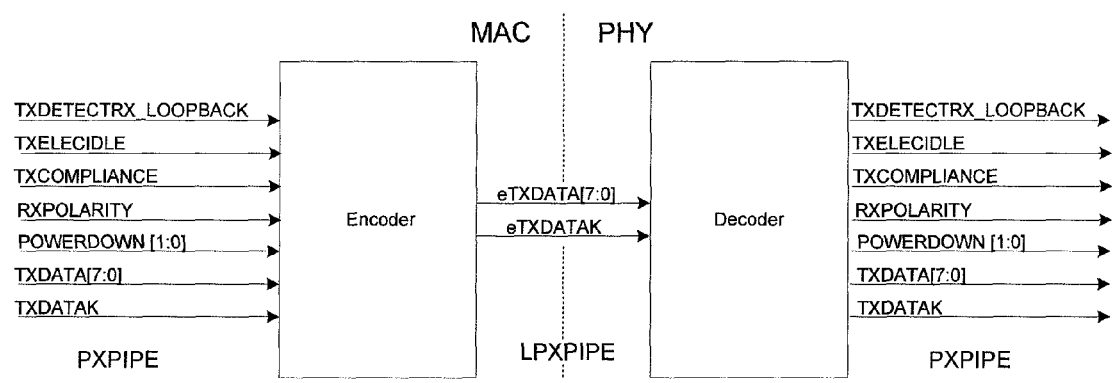
FIG. 2 represents a block diagram for the TXDATA side, according to an example embodiment of the present invention.

FIG. 2 represents a block diagram for the TXDATA side. The encoder is part of the MAC and the decoder is part of the PHY. The encoding utilizes the fact that not all combinations of Tx command signals are valid to simplify the encoded symbols. The valid combinations are illustrated in FIG. 7.

The encoding further uses the unused K-codes to send encoded value of the command signals over the PIPE interface when data is not being transmitted. When data is being transmitted, selected valid symbols are encoded as K-codes that are not part of the valid set of K-codes. A valid set of K-codes is shown in FIG. 8.

To simplify encoding and decoding, TXDATA[4] and TXDATAK are primarily used for differentiating normal data/k-codes from encoded K-codes. This is one example of partial decoding that can simplify the decoder logic. TXDATAK is used because the only characters that are not part of the valid 8b10b symbols set defined by PCI Express are characters with TXDATAK=1 (i.e., K-codes). TXDATA[4] is used as it is seen from FIG. 7 that all valid K-codes as defined by PCI Express have TXDATA[4]=1.

Figure 3:
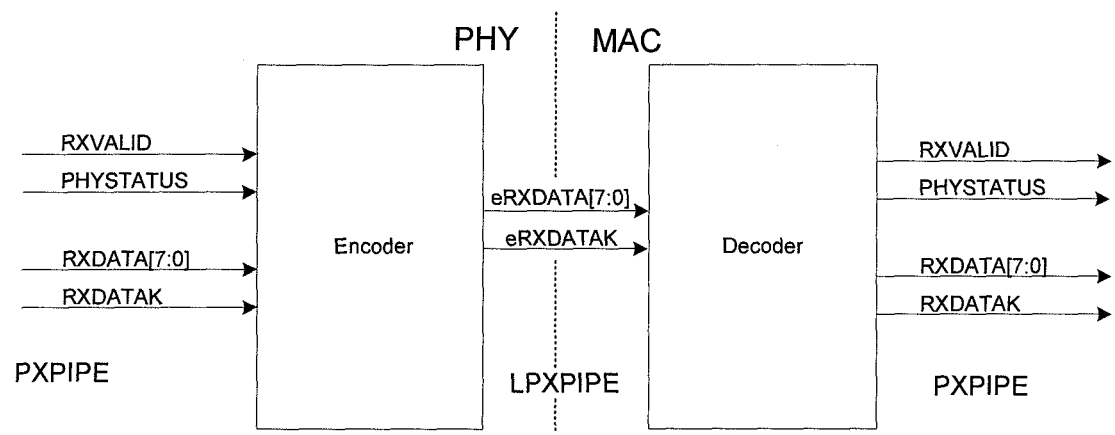
FIG. 3 represents a block diagram for the RXDATA encoder side, according to an example embodiment of the present invention.

With regard to the receiving portion, the following status signals are encoded and multiplexed to eRXDATA and eRXDATAK: RXVALID and PHYSTATUS. FIG. 3 represents a block diagram for the RXDATA encoder side. The RX encoding, like the TX encoding, utilizes the fact that sometimes status signals are invalid and transmits the status signals only when no valid data is being transmitted on the RXDATA and RXDATAK lines.

In a specific embodiment, the pin count is reduced from a 33-pin count (PXPIPE) to a 25-pin count (LPXPIPE). While 8 pins are reduced, LPXPIPE with 25 pins may convey the same information as 33-pin PXPIPE.

Various command signals are encoded to create eTXDATA and eTXDATAK. Various schemes for encoding and decoding are possible, however the following description provides only one such manifestation. PXPIPE does not support P2 power management state and hence it is not encoded into eTXDATA and eTXDATAK. As discussed herein, the encoding may be expanded and various methods may be implemented to encode P2 power management state and command signals associated with that state. Using one such method, partial decoding is used to simplify the encoding and decoding logic (i.e., the decoder does not look at all the 9 bits of eTXDATA[7:0] and TXDATAK to decode the COMMAND/STATUS). It is also possible to choose a full decoding scheme where the decoder uses all the 9 data lines to decode the encoded COMMAND/STATUS information.

From FIG. 7, it can be seen that TXELECIDLE can only be '0' when POWERDOWN=00, in all other states TXELECIDLE is '1.' When TXELECIDLE is '1', the data on TXDATA and TXDATAK are "don't care." This is because the PHY only transmits data when POWERDOWN=00 and TXELECIDLE=0.

When POWERDOWN=00 and TXELCIDLE=0, only valid DATA characters (D-codes) and DATAK characters (K-codes) are present on the TXDATA and TXDATAK lines. Valid data or DATAK characters, as defined by PCI Express Specification, have the following properties: Data Characters: valid data characters have TXDATAK=0; DATAK Characters: valid DATAK characters have at least TXDATAK='1' and TXDATA[4]='1.' The encoder and the decoder use the properties above to encode eTXDATA and eTXDATAK. The encoding and decoding rules are described below.

When POWERDOWN=00, TXELECIDLE=0 and TXDATAK=0, the encoder passes TXDATA to eTXDATA and TXDATAK to eTXDATAK unchanged. Also, the decoder decodes eTXDATAK=0 as TXELECIDLE=0 and POWERDOWN=00 while eTXDATA and eTXDATAK contain valid Data characters to be transmitted.

When POWERDOWN=00 and TXELECIDLE=0 and TXDATAK=1, the encoder passes TXDATA to eTXDATA and TXDATAK to eTXDATAK unchanged. The decoder decodes eTXDATAK=1 and eTXDATA[ ]=1 as TXELECIDLE=0, POWERDOWN=00, while eTXDATA and eTXDATAK contain valid K-codes to be transmitted.

When TXELECIDLE=1 (TXELECIDLE=1 is possible in the power management states P0, P1 and P0s), the encoder forces eTXDATAK=1 and eTXDATA[ ]=0, for all states. The decoder decodes eTXDATAK=0 and eTXDATA[ ]=0 as TXELECIDLE=1.

This creates a set of unique combinations on eTXDATA and eTXDATAK where eTXDATA[ ]=0 and eTXDATAK=1. This combination does not occur when valid D-codes or K-codes are being transmitted. The eK-codes transmitted are not part of the predefined valid K-codes in the PCI Express Specification.

When TXELECIDLE=1, POWERDOWN can be 00, 01 or 10 representing P0, P0s and P1 states respectively (where P2 is not supported). The encoder encodes the POWERDOWN [1:0] bits to eTXDATA[1:0]. The encoder/decoder follow the following rules. The encoder encodes TXELECIDLE='1' to the following eTXDATAK=1, eTXDATA[ ]=0, eTXDATA[1:0]=POWERDOWN[1:0]. The decoder decodes the eTXDATAK=1 and eTXDATA[ ]=0 as TXELECIDLE=1 and POWERDOWN[1:0]=eTXDATA[1:0]

Intel PIPE Specification defines this signal to have different meanings in different POWERDOWN states. For example, in P1 mode, when TXDETECTRX_LOOPBACK is high, the PHY is instructed to perform a receiver detect sequence. In P0 mode, when TXDETECTRX_LOOPBACK is high, the PHY is instructed to perform loopback operation.

The TXDETECTRX and LOOPBACK are encoded to eTXDATA and eTXDATAK separately. For encoding of TXDETECTRX (i.e., TXDETECTRX_LOOPBACK=1) when POWERDOWN=10, the encoder encodes POWERDOWN=10, (only valid value for TXELECIDLE=1) and TXDETECTRX_LOOPBACK=1 as eTXDATAK=1, eTXDATA[ ]=0, eTXDATA[1:0]=POWERDOWN[1:0] (same as POWERDOWN encoding/decoding) eTXDATA[ ]=TXDETECTRX_LOOPBACK. When the eTXDATA[ ] bit is high the PHY is instructed to do a receiver detect sequence. The decoder decodes eTXDATAK=1, eTXDATA[ ]=0, eTXDATA[1:0]=10 and eTXDATA[ ]=1 as TXELECIDLE=1, POWERDOWN=10, TXDETECTRX_LOOPBACK=1. eTXDATA[ ] exclusively indicates TXDETECTRX, when eTXDATAK=1 and eTXDATA[ ]=0, it is not necessary for the decoder to look at eTXDATA[1:0] to verify the POWERDOWN state to be 10. TXDETECTRX can only be done in POWERDOWN state P1 (i.e. 10).

When encoding LOOPBACK, LOOPBACK is signaled when POWERDOWN=00=P0 and TXELECIDLE=0. This means that the PHY is actively transmitting. The PHY, however, does not transmit the data that is present on the TXDATA and TXDATAK, but internally loops back received data. This means during LOOPBACK, TXDATA and TXDATAK are "don't care" for the PHY.

To keep previous encoding/decoding, the encoder gives priority to TXELECIDLE and uses K-code to signal LOOPBACK to the decoder. During loopback the signals have the following states: POWERDOWN=00, TXELECIDLE=0, TXDETECTRX_LOOPBACK=1. The encoder needs to encode this into a K-code that the decoder can decode easily, so a K-code with TXDATAK=1, TXDATA[4]=1, this corresponds to normal K-code transmission mode, TXDATA[0]=1, TXDATA[1]=1 and TXDATA[7]=0 is finally used to decode LOOPBACK.

These K-codes are not part of the predefined valid K-codes in the PCI Express Specification. The encoder uses POWERDOWN=00, TXELECIDLE=0, TXDETECTRX_LOOPBACK=1 to encode the following: eTXDATAK=1, eTXDATA[ ]=1, eTXDATA[7]=0, eTXDATA[ ]=1 eTXDATA[ ]=1.

The decoder uses eTXDATAK=1 and eTXDATA[ ]=1 to decode TXELECIDLE=0 and POWERDOWN=00. It further uses eTXDATA[7]=0, eTXDATA[ ]=1 and eTXDATA[ ]=1 to decode TXDETECTRX_LOOPBACK=1.

TXCOMPLIANCE is high when the PHY is required to transmit a COMMA with a negative disparity during the compliance pattern transmission. The compliance pattern consists of a COM-DATA-COM-DATA.

Since TXCOMPLIANCE is valid during normal data transmission and while a COMMA is being transferred across the PIPE interface, to simplify decoding a eK-code outside the pre-defined set by PCI Express is used.

The eK-code needs to have eTXDATAK=1 and eTXDATA[ ]=1. This may be useful in simplifying the decoding of POWERDOWN=00, TXELECIDLE=0. Additional bits are encoded and explained herein.

When TXCOMPLIANCE=1, TXDATA=BC(hex) and TXDATAK=1, the encoder uses TXCOMPLIANCE to force eTXDATA[ ]=0. All other bits pass unchanged. The decoder decodes eTXDATA="10110100" and eTXDATAK=1 to POWERDOWN=00, TXELECIDLE=0 (since eTXDATA[ ]=1). eTXDATA[ ]=0 and eTXDATA[ ]=0 decode to TXCOMPLIANCE=1. TXDATA[3] is forced to a 1, making the TXDATA as BC(hex), (i.e., the code for COMMA).

The PHY can be instructed to reverse polarity during normal data transmission. This typically happens when the PHY is transmitting/receiving TS1/TS2 training sets.

In this particular instance, it is not possible to map every valid character to an equivalent encoded K-code to indicate RXPOLARITY. For this reason, 3 characters are chosen, that are part of the TS1/TS2 sets. The chosen characters include COMMA, D5.2 and D10.2.

The encoder then sends a predetermined eK-code (COMMA-P) whenever it sees a COMMA on the TX interface and RXPOLARITY is high. The decoder then asserts RXPOLARITY high whenever it sees COMMA-P on the eTXDATA and eTXDATAK lines.

Similarly the encoder encodes the following eK-codes from the D-codes when RXPOLARITY is high: D5.2->D5.2-P and D10.2->D10.2-P.

Example encoding and decoding rules for the various characters are shown below.

For COMMA-P, the encoder identifies that COMMA is being transmitted on TXDATA and TXDATAK and then forces eTXDATA[ ]=0. The encoder passes all other signals without modifications. The decoder decodes eTXDATAK and eTXDATA[ ] as POWERDOWN=00 and TXELECIDLE=0. It also decodes eTXDATA[ ]=0 and eTXDATA[ ]=0 as RXPOLARITY=1 and forces TXDATA[2]=1 to get back a BC(hex) (i.e., COMMA) on the TXDATA and TXDATAK lines.

For D5.2-P, the encoder first identifies D5.2 present on TXDATA and TXDATAK lines, then forces eTXDATAK=1, eTXDATA[ ]=1. The decoder decodes eTXDATAK=1 and eTXDATA[ ]=1 as POWERDOWN=00 and TXELECIDLE=0. The decoder further decodes eTXDATA[7]=0, eTXDATA[ ] XOR eTXDATA[ ] as RXPOLARITY=1 and forces TXDATA[4]=0 and TXDATAK=0.

For D10.2-P (D10.2=010 01010), the encoder first identifies D10.2 present on TXDATA and TXDATAK lines and then forces eTXDATAK=1, eTXDATA[ ]=1. The decoder decodes eTXDATAK=1 and eTXDATA[ ]=1 as POWERDOWN=00 and TXELECIDLE=0. The decoder further decodes eTXDATA[7]=0, eTXDATA[ ] XOR eTXDATA[ ] as RXPOLARITY=1 and forces TXDATA[4]=0 and TXDATAK=0.

The encoding/decoding of RXPOLARITY relies on the facts that COMMA, D5.2 and D10.2 appear periodically in the PCI Express data streams and that RXPOLARITY is meant for reversing the RX_P and RX_N polarities for easy PCB layout, and is not meant to toggle from symbol to symbol. Rather, RXPOLARITY often functions as a relatively static signal.

FIG. 9 shows the encoding and the decoding summary of possible COMMAND sequences from the MAC to the PHY. Values that are bold in the eTXDATA and eTXDATAK column are used by the decoder to decode the command signals. The PHYSTATUS and RXVALID can be encoded as eRXDATA and eRXDATAK. Similar to TXDATA, RXDATA encoding uses eK-codes to encode information to RXDATA side.

The following discussion describes interface requirements and how certain signals can be encoded as a result.

After reset, receive side is idle so PHYSTATUS can be multiplexed with RXDATA. During receiver detect, the receive side is idle, so PHYSTATUS can be multiplexed with RXDATA. From P1->P0: PHYSTATUS is toggled high, soon after entry into P0, this is a fixed time response that is guaranteed without failure, so PHYSTATUS response is not required, only a fixed time delay for PHY to enter P0 needs to be considered. From P0->P0s: This transition can occur only when the transmit channel is idle but the receive side may or may not be idle. It is not possible to multiplex the PHYSTATUS response on the RXDATA lines. The response is however not required as it is guaranteed to come after a fixed amount of delay. From P0s->P0: This transition can happen when the receive cannel is not idle, it is hence not possible to multiplex the PHYSTATUS with RXDATA. The PHYSTATUS response is, however, guaranteed to come after a fixed amount of delay and hence not required to be generated by the PHY. From P0->P1: This transition may only occur when both transmit and the receive channels are idle, the PHYSTATUS response may be multiplexed with RXDATA. The response is, however, guaranteed to come and hence not really required to be generated by the PHY.

In PXPIPE, P2 is not supported, hence PHYSTATUS response is not required to be encoded for entry and exit to this state.

FIG. 10 shows an example of PHYSTATUS encoding. The encoder will encode PHYSTATUS to eRXDATA and eRXDATAK when RXVALID=0. When RXVALID=1, the decoder looks at the POWERDOWN[1:0] signals to generate the PHYSTATUS signal response as a result of power state changes locally using a pre-determined counter.

For RXVALID encoding RXDATA and RXDATAK have valid meaning only when RXVALID=1. When RXVALID=0, the MAC ignores the RXDATA and RXDATAK. So RXVALID=0 is encoded as a special eK-code and when this eK-code is not present RXVALID is 1.

FIG. 11 shows an example of RXVALID encoding. To encode RXVALID=0, the eRXDATA and eRXDATAK are encoded as follows: eRXDATA[7:0]="0XXX00XX" and eRXDATAK='1'. Bits that are 'X' are not looked at by the decoder to decode the function. These bits may have any value as long as they are not defined to have other meanings and could be decoded to represent some other status also.

FIG. 12 shows an example of RX decoding. For RX decoding the following rules may be used. For eRXDATAK=1, eRXDATA[7]=0 and eRXDATA[ ]=0. When this is true, RXDATA[1]=PHYSTATUS and RXDATA[3]=RXVALID.

According to another embodiment the pin count may be further reduced to 22 pins. LPXPIPE with 22 pins provides further reduction in pin count at the sacrifice of a slight decrease in information conveyed on the receiver status signals.

FIG. 13 shows an example of RXSTATUS encoding. For RXSTATUS encoding, RXSTATUS is a 3-bit vector and indicates the status from the PHY to the MAC. Each of the STATUS represented by RXSTATUS has a potential to be encoded as eRXDATA and eRXDATAK. Some status information may be encoded with loss of some information.

For example, SKP is transferred exclusively when a comma of a SKP frame is being transferred over the PIPE interface. This can easily be encoded by assigning an eK-code to represent a COMMA and SKP added.

For SKP removed, the corresponding information is transferred exclusively when a comma of a SKP frame is being transferred over the PIPE interface. This can be encoded by assigning an eK-code to represent a COMMA and SKP removed.

For receiver detected, the corresponding information is transferred when PXPIPE is in P1 state and no valid data is being transmitted over the eRXDATA and eRXDATAK lines. PHYSTATUS is already encoded, bit 0 can hence be used to encode the receiver detect status.

For 8b/10b decode error, the PXPIPE currently requires that an EDB be transferred over the PXPIPE interface when a decode error occurs. This can be encoded to eRXDATA and eRXDATAK by defining a new k-code.

For Elastic Buffer overflow, which indicates that the buffer has overflowed and a symbol is dropped from the stream, the PXPIPE interface simply transfers the next symbol. There is no way to encode this to eRXDATA and eRXDATAK without replacing the next symbol with an eK-code to indicate overflow. This would mean that there would have been a loss of one extra data symbol, so elastic buffer overflow is not encoded in this scheme.

For Elastic Buffer underflow, an EDB is transmitted on the PXPIPE interface and the status is indicated by the RXSTATUS. This can be encoded into eRXDATA and eRXDATAK by defining an eK-code to replace the EDB.

For receive disparity error, there is no way to encode disparity error into eRXDATA and eRXDATAK as the symbol with bad disparity is not replaced during data transmission. If this is replaced by an eK-code that indicates disparity error then there will be some loss of information.

It is possible to define valid k-codes to equivalent eK-codes with disparity error (since there are only 12 of these), but not possible to do this with the normal data.

From the above discussion, it can be seen that 5 status states can be encoded into eRXDATA and eRXDATAK without loss of any information. Such encoding may reduce the number of RXSTATUS lines from 3 to 2. The 2 lines of RXSTATUS will indicate the following: Disparity Error; Overflow; OKAY; and RESERVED. If there is not requirement to indicate DISPARITY error or if these are treated exactly like decode errors then the number of lines can be reduced to just 1 to indicate Overflow and OKAY. Further, if OVERFLOW info is encoded and some loss of data is acceptable (CRC will fail in either case), then all RXSTATUS lines can be encoded to eRXDATA and eRXDATAK FIG. 14 shows how various bits can be used by the decoder to decode certain status/states from the PHY. Bits that are X are not used by decoder for decoding and are unknown and the encoder can choose any value as long as they do not decode to any other encoded state. Bits that are bold are used by the decoder to decode the encoded Value. Bits that are not bold show the value that is transmitted on eRXDATA.

According to another embodiment of the present invention, a Multi Lane Implementation may be employed. The discussion generally assumes a single-lane implementation for the LPXPIPE interface. The same encoding scheme may be applied to multilane PCI Express PHY-MAC interface. For example, Philips 111-pin four-lane PXPIPE interface can be reduced to 91-pin LPXPIPE for no loss of information. With some decrease of information conveyed on the receiver status signals, pin count can further be reduced to 79 pins.

The multilane PXPIPE implementation currently shares POWERDOWN and some other signals among the various lanes. This effectively reduces the interface count; however, it makes it impossible to split the PHY into separate lanes. The LPXPIPE encoding scheme not only reduces the number of interface lines for multilane PHY but further allows a full set of COMMAND and STATUS signals to be encoded for each lane, thereby allowing the PHY to be split into multiple lanes so that each lane may be controlled individually.

For additional command and status signals within LPXPIPE, the command/status signal encoding scheme described in this document may be extended to allow many other functions or features to be encoded into the DATA and DATAK lines.

A few possible extensions in command/status information are considered herein. Some special test functions can be encoded into eK-codes this allows the MAC to instruct the PHY to perform some TEST debugging functions that are otherwise not possible for MAC to control. One example is PXPIPE-side parallel loopback of TXDATA to RXDATA (local-loopback). The start of local-loopback can be instructed using an eK-code and the stop can be instructed using another eK-code. This feature is particularly useful for signal integrity check of the PHY-MAC interface.

One possible example is to use an eK-code with eTXDATA[ ]=0 and eTXDATAK=1, and eTXDATA[ ] to encoded TEST start/stop commands. FIG. 15 shows an example of 2 eK-codes to start and stop PXPIPE side parallel loopback.

Lane reversal for multi-lane implementation is particularly useful to ease PCB layout, in case the lanes of the communicating ports have their lane order swapped. This feature is typically performed in the MAC, which detects and initiates lane reversal while the PHY is oblivious. Implementation of this feature in the PHY, would normally require a signal from the MAC to the PHY to enable and disable lane reversal. These signals can be encoded as eK-codes and the PHY can reverse lanes without adding an extra signal in the LPXPIPE interface. Similar to the eK-codes used for TEST in the preceding section, FIG. 16 shows an example of eK-codes to enable and disable lane reversal.

Lane-to-lane deskewing is a requirement in PCI Express specification, and is typically implemented in the MAC. When the PHY offers a feature to deskew the receiver lanes, the MAC normally needs to instruct the PHY as to when it should start the deskew sequence. The PHY responds with some status signals whether the deskew attempt by the PHY has been successful or not. These operations normally would have required side-band signals on the PXPIPE interface. For LPXPIPE, these command and status signals can be encoded as eK-codes as well.

These eK-codes are preferably to sent while the PHY is actively transmitting. This does, however, occur when TS1/TS2 sets are being transmitted. Therefore, an eK-code that encodes lane-to-lane deskew instruction along with a comma character is defined. Since almost all of the K-codes with eTXDATA[5]=1 have already been used, new eK-codes with eTXDATA[5]=0 will be used to encode this command. Also the TXELECIDLE encoding will be redefined as shown in FIG. 17. The response from the PHY is shown in FIG. 18.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, one or more of the above example embodiments and implementations may be implemented with a variety of PCI Express devices and other approaches, including chips and printed circuit boards (PCBs). For example, the above example embodiments and implementations may be integrated with a variety of circuits, devices, systems and approaches including those for use in connection with storage, display, networking and mobile communications. In addition, various embodiments discussed in the context of PCI and PCI Express type applications may be implemented using a variety of devices and communications approaches, including those not necessarily applicable to PCI or PCI Express. These approaches are implemented in connection with various example embodiments of the present invention. Such modifications and changes do not depart from the true spirit and scope of the present invention that is set forth in the following claims.

The invention claimed is:

1. A method for transmitting data between a Media Access Control Layer (MAC) and a Physical Layer (PHY) using an internal data bus for transmitting a set of internal symbols between the MAC and PHY, the set of internal symbols having a subset of internal symbols, the method comprising:
    providing command information carried on one or more dedicated command lines;
    providing data symbols carried on an external data bus using dedicated data lines;
    encoding the provided command information into one or more of the subset of internal symbols, wherein each internal symbol of the subset of internal symbols represents command information and is otherwise invalid in respective encoding for the internal bus; and
    transmitting the one or more of the subset of internal symbols between the MAC and the PHY using the internal data bus.

2. The method of claim 1, wherein the internal data bus uses 8b encoding and the PHY uses 10b encoding and wherein the step of encoding includes setting two bits to indicate that a particular symbol represents command information and setting the remaining bits to identify a particular command.

3. The method of claim 1, wherein the PHY is PCI Express PHY and further including detecting a state of an RXPOLARITY signal on the external bus and, in response to the detection, transmitting a predetermined symbol from the subset of symbols using the internal data bus.

4. The method of claim 1, wherein the subset of internal symbols is a set of K-codes that includes symbols that are otherwise invalid in respective 10b encoding.

5. The method of claim 1, wherein external bus is part of the MAC and wherein the step of transmitting transmits the subset of internal symbols from the MAC to the PHY, the PHY being a PCI Express PHY, and wherein the subset of internal symbols is indicated by setting a PHYSTATUS bit.

6. The method of claim 5, further including the steps of
    receiving status information carried on one or more dedicated status lines;
    receiving data symbols carried on a second external data bus;
    encoding the received status information into one or more of the subset of internal symbols; and
    transmitting the one or more of the subset of internal symbols from the PHY to the MAC using the internal data bus.

7. A system for transmitting data between a Media Access Control Layer (MAC) and a Physical Layer (PHY) using an internal data bus for transmitting a set of internal symbols between the MAC and PHY, the set of internal symbols having a subset of internal symbols, the system comprising:
    an external data bus carrying data symbols;
    an external interface configured and arranged to provide command information on one or more dedicated command lines and to provide the data symbols;
    an encoder configured and arranged to encode the provided command information into one or more of the subset of internal symbols, wherein each internal symbol of the subset of internal symbols represents command information and is otherwise invalid in respective encoding for the internal bus; and
    an internal interface configured and arranged to transmit for transmitting the one or more of the subset of internal symbols and the data symbols between the MAC and the PHY using the internal data bus.

8. The system of claim 7, wherein the internal data bus uses 8b encoding and the PHY uses 10b encoding.

9. The system of claim 7, wherein the PHY is PCI Express PHY.

10. The system of claim 7, wherein the subset of internal symbols is a set of K-codes that includes symbols that are otherwise invalid in respective 10b encoding.

11. The system of claim 7, wherein external data bus is part of the MAC and wherein the internal interface transmits the subset of internal symbols from the MAC to the PHY.

12. The system of claim 11, further including
    a second external interface for receiving status information carried on one or more dedicated status lines and for receiving data symbols carried on a second external data bus; an encoder for encoding the received status information into one or more of the subset of internal symbols; and
    an internal interface for transmitting the one or more of the subset of internal symbols from the PHY to the MAC.

13. The system of claim 7, wherein the encoder is further configured and arranged to set two bits to indicate that a particular symbol represents command information and to set the remaining bits to identify a particular command.

14. The system of claim 7, and further including a decoder configured and arranged to detect a state of an RXPOLARITY signal on the external bus and, in response to the detection, transmitting a predetermined symbol from the subset of symbols using the internal data bus.

15. The system of claim 7, wherein, the PHY is a PCI Express PHY, and wherein the subset of internal symbols is indicated by setting a PHYSTATUS bit.

16. A system for transmitting data between a Media Access Control Layer (MAC) and a Physical Layer (PHY) using an internal data bus for transmitting a set of internal symbols between the MAC and PHY, the set of internal symbols having a subset of internal symbols, the system comprising:
- an external data bus carrying data symbols;
- means for providing command information on one or more dedicated command lines and to provide the data symbols;
- means for encoding the provided command information into one or more of the subset of internal symbols, wherein each internal symbol of the subset of internal symbols represents command information and is otherwise invalid in respective encoding for the internal bus; and
- for transmitting the one or more of the subset of internal symbols and the data symbols between the MAC and the PHY using the internal data bus.

\* \* \* \* \*